Mar. 6, 1923. Re. 15,552

L. L. KNOX

WATER COOLED VALVE OR DAMPER

Original Filed July 6, 1914 2 sheets-sheet 1

INVENTOR

Luther L. Knox by his attorneys

Byrnes, Townsend & Brewer

Mar. 6, 1923. Re. 15,552

L. L. KNOX

WATER COOLED VALVE OR DAMPER

Original Filed July 6, 1914 2 sheets-sheet 2

INVENTOR

Luther L. Knox
by his attorneys
Byrnes, Stebbins & Parmelee.

Reissued Mar. 6, 1923. Re. 15,552

UNITED STATES PATENT OFFICE.

LUTHER L. KNOX, OF BELLEVUE, PENNSYLVANIA, ASSIGNOR, BY MESNE ASSIGNMENTS, TO BLAW-KNOX COMPANY, OF PITTSBURGH, PENNSYLVANIA, A CORPORATION OF NEW JERSEY.

WATER-COOLED VALVE OR DAMPER.

Original No. 1,142,180, dated June 8, 1915, Serial No. 849,166, filed July 6, 1914. Application for reissue filed December 27, 1922. Serial No. 609,343.

*To all whom it may concern:*

Be it known that I, LUTHER L. KNOX, a citizen of the United States, residing at Bellevue, in the county of Allegheny and State of Pennsylvania, have invented a new and useful Water-Cooled Valve or Damper, of which the following is a full, clear, and exact description, reference being had to the accompanying drawings, forming part of this specification, in which—

My invention has relation to water-cooled valves or dampers for use in furnace flues, and is particularly advantageous for use as a controlling valve or damper in connection with the air and gas flues of reversing regenerator furnaces.

The present invention is an improvement upon the valve or damper described and claimed in my pending application, Serial No. 762,230, filed April 19, 1913.

The object of the present invention is to provide a valve or damper of the general construction described and claimed in said application, but having certain improvements whereby the movable valve or damper member may be more effectively seated and operated.

Referring to the accompanying drawing, the numeral 2 designates a portion of a flue adapted to be controlled by my improved valve or damper.

Figure 1:
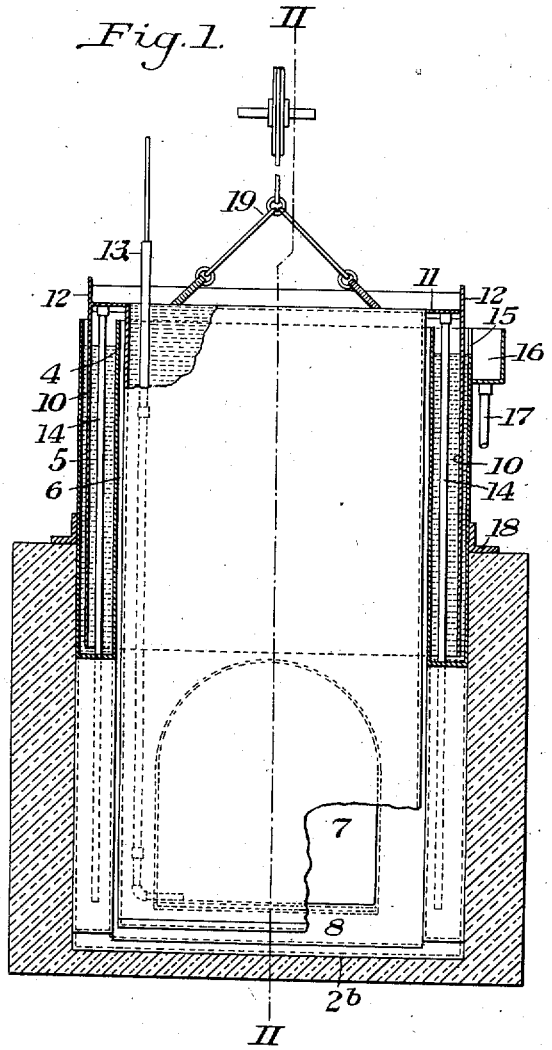
Figure 1 is a sectional elevation, partly broken away, of a valve or damper embodying my invention.
Figure 2:
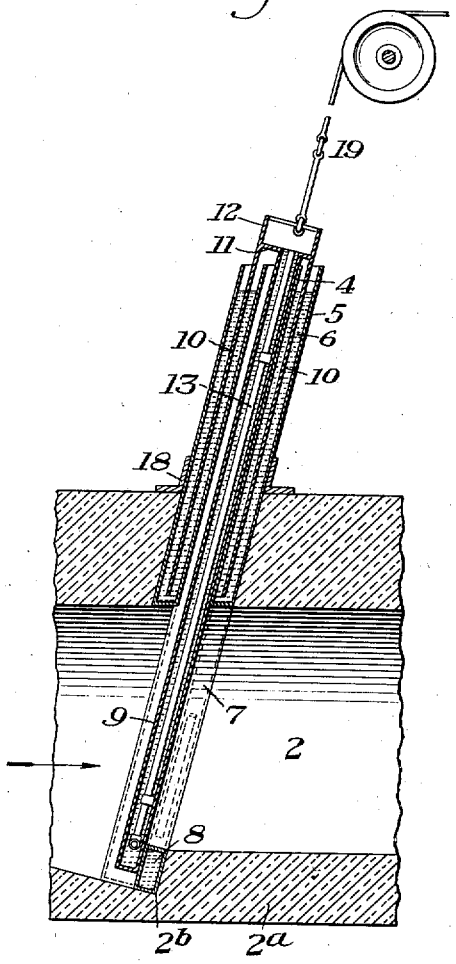
Figure 2 is a section on the line II—II of Figure 1.
Figure 4:
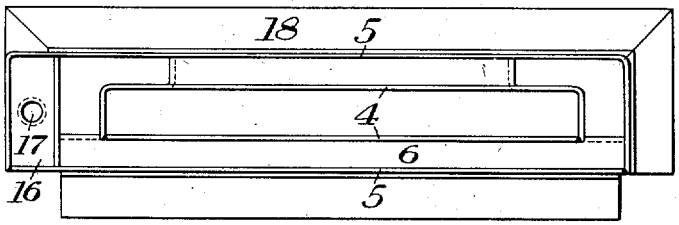
Figure 4 is a top plan view of the same.
Figure 3:
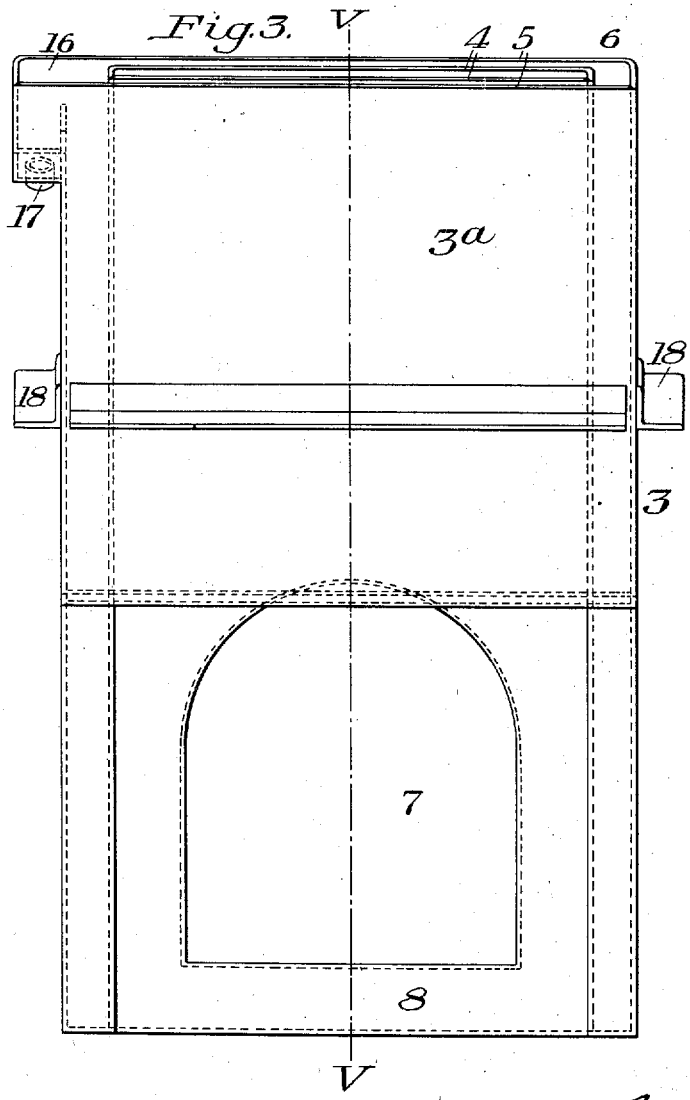
Figure 3 is a front elevation of the water cooled frame.
Figure 5:
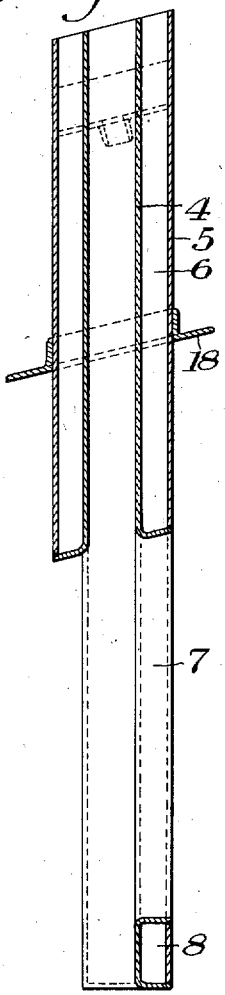
Figure 5 is a section on the line V—V of Figure 3.

3 designates a frame or seating member preferably formed of sheet metal and adapted to be set in the flue 2, as indicated in Figure 2. This frame or seating member consists of an upper portion $3^a$ having an inner wall 4 and an outer wall 5, the two walls being separated to form a water chamber 6 entirely surrounding the inner wall. The lower portion of the frame or seating member has a flue opening 7 therethrough in line with the flue passage 2. The front portion of the water chamber 6 terminates at its bottom adjacent to the top of the opening 7, whereas the rear and side portions of said water chamber extend downwardly to the bottom of the opening 7 where they are connected by the hollow transverse portion 8. The frame or seating member is set in the flue in a somewhat oblique position, the bottom wall $2^a$ of the flue passage being preferably downwardly offset, as shown at $2^b$, to form a seating shoulder for the transverse connection portion 8.

9 designates the valve or damper proper. This is a hollow rectangular plate which is arranged to slide within the inner wall 4 of the frame or seating member and to be raised and lowered to cover or uncover any desired portion of the flue opening 7. It is provided with the front and rear depending aprons 10 which are arranged to extend downwardly within the front and rear water chambers in the portion $3^a$, and thus form an efficient seal against the escape of any of the flue gases around the valve. The valve or damper body is preferably open at the top, the portions 11 which connect the aprons 10 with the valve body and the upward extensions 12 of said aprons forming a water pan at the top of said body.

The space within the inner shell 4 in which the valve or damper body slides is preferably made considerably wider (measured in the direction of the axis of the flue 2) than the thickness of said body, so that the latter will not only slide freely therein; but, owing to the oblique seating of the parts will, by gravity, maintain an efficient seating against the rear position of the seating member or frame. Any suitable means may be provided for maintaining a water circulation through the frame or seating member and the valve or damper member.

In the drawing I have shown a water supply pipe 13 as extending downwardly to a point near the bottom of the valve body where it discharges within the interior of said body. The heated water rises into the pan at the top of the body and thence flows down to the lower end portions of the side legs of the frame or seating member through the pipes 14 which open at their upper ends into said pan through the portions 11. As the water is further heated in the frame or seating member, it rises until it reaches an overflow opening at 15 into a box or trough 16 having a discharge 17, by means of which it is carried away. In this manner an effective circulation is maintained, the water flowing first through the body of the valve or damper and then in series through the frame or seating member. All the circulating pipes are carried in the parts themselves, independently of the flue walls, so that the valve can be set as a unit, without the necessity for passing the pipes separately through the flue walls. The frame or seating member may be provided with the supporting flanges 18 which rest upon the top of the flue 2. The overflow box or trough 16 may be conveniently formed as an end extension of the upper part of the portion 3ª of the frame or seating member.

19 indicates any suitable actuating connection for raising and lowering the valve or damper. By seating the parts in an oblique position the valve will maintain its seat under all conditions, thus avoiding any necessity for the provision of special means for crowding the valve against the seating surfaces of the frame. This seating will be maintained since the valve will clear itself of deposits of tar and other carbonaceous matter carried by the flue gases. The inclination of the valve and seating member is in such a direction relatively to the flow of gases through the flue 2 as to cause the pressure of the gases, when the valve is closed to press the valve to its seat. The arrow in Figure 2 indicates the direction in which the gases flow when the valve is closed.

I do not desire to limit myself to the details of construction and arrangement as herein shown and described, as various changes can be made in parts without departing from the spirit and scope of my invention as defined in the appended claims.

I claim:

1. A valve or damper comprising a hollow water-cooled frame set in an oblique position in a flue wall and having a flue opening through its lower portion, and a hollow water-cooled valve or damper body arranged to slide and seat within said frame in an inclined position whereby the said body is held by gravity in close contact with the adjacent surface of the frame against which it bears, substantially as described.

2. A valve or damper comprising a hollow water-cooled frame set in an oblique position in a flue wall and having a flue opening through its lower portion, and a hollow water-cooled valve or damper body arranged to slide and seat within said frame in an inclined position whereby the said body is held by gravity in close contact with the adjacent surface of the frame against which it bears, said frame having open front and rear water chambers extending above the top of the flue and the valve or damper having depending aprons which extend within said chambers, substantially as described.

3. A hollow valve seating member having a flue opening therethrough and comprising a casing formed with inner and outer walls, the inner wall surrounding a transverse vertical opening which extends downwardly within the casing from the upper end thereof to form an inclosing guideway for a valve or damper, the front portion of said guideway terminating at its bottom at about the top of the flue opening and the rear portion extending downwardly below said opening, said casing having openings at its upper end to receive seating members on the valve or damper, and means for maintaining a circulation of water through said member, substantially as described.

4. A valve or damper comprising a hollow body opening at its top into a water pan and having depending flanges or aprons spaced upon the body, means for introducing a cooling liquid into said body, and water pipes opening at their upper ends into the said water pan and extending downwardly between the aprons and the body, substantially as described.

5. A valve or damper comprising a frame member consisting of a casing formed of inner and outer walls, the inner wall surrounding a transverse vertical opening which extends downwardly within the casing from the upper end thereof to form an inclosing guideway, said casing also having a horizontal flue opening intersecting the the vertical opening, the spaces between the inner and outer walls of the casing at its upper portion being adapted to contain a cooling medium and having openings at its upper end, a hollow valve body arranged to slide in said guideway and having a water pan at its top communicating with the interior thereof, said valve having depending sealing aprons arranged to extend through the openings at the top of the frame into the water spaces thereof, and also having pipes communicating with this water pan and depending into said water spaces, substantially as described.

6. A valve or damper comprising a frame member consisting of a casing formed of inner and outer walls, the inner wall surrounding a transverse vertical opening which extends downwardly within the casing from the upper end thereof to form an inclosing guideway, said casing also having a horizontal flue opening intersecting the the vertical opening, the spaces between the inner and outer walls of the casing at its upper portion being adapted to contain a cooling medium and having openings at its upper end, a hollow valve body arranged to slide in said guideway and having a water pan at its top communicating with the interior thereof, said valve having depending sealing aprons arranged to extend through the openings at the top of the frame into the water spaces thereof, and also having pipes communicating with this water pan and depending into said water spaces, the frame also having an overflow opening and an overflow receptacle adjacent to said opening, substantially as described.

7. The combination with a wall having a flue opening therethrough, of a hollow frame or casing set obliquely in said wall and extending upwardly therefrom, said frame having a flue opening therethrough and having front and rear water chambers at its upper portion, one of said water chambers terminating at the top of the flue, and a hollow water-cooled valve arranged to slide and set in an inclined position within said frame member, substantally as described.

8. A valve or damper comprising a hollow water-cooled frame set in an oblique position in a flue wall and having a flue opening through its lower portion and a hollow water-cooled valve or damper body arranged to slide and seat within said frame in an inclined position, whereby the said body is held by gravity in close contact with the adjacent surface of the frame against which it bears, said valve consisting of a hollow box having sufficient water capacity to substantially prevent warping by hot waste gases when in use as a valve or damper in the flue of a reversing regenerative furnace, substantially as described.

9. A valve or damper comprising a hollow water-cooled frame set in an oblique position in a flue wall and having a flue opening through its lower portion and a hollow water-cooled valve or damper body arranged to slide and seat within said frame in an inclined position, whereby the said body is held by gravity in close contact with the adjacent surface of the frame against which it bears, and a flexible connection arranged to raise and lower said damper body, said connection allowing the said damper body to accommodate itself to its seat on the frame, substantially as described.

10. A valve or damper comprising a hollow water-cooled frame set in an oblique position in a flue wall and having a flue opening through its lower portion, and a hollow water cooled valve or damper body arranged to slide and and seat within said frame in an inclined position, whereby the said body is held by gravity in close contact with the adjacent surface of the frame against which it bears, said valve consisting of a hollow box having sufficient water capacity to substantially prevent warping by hot waste gases when in use as a valve or damper in the flue of a reversing regenerative furnace, and a flexible connection for raising and lowering the valve or damper body arranged to allow it to accommodate itself to the water-cooled seat, substantially as described.

11. A valve or damper for use in connection with the flue system of a reversing regenerative furnace having the usual air, gas and stack flues, comprising a hollow water-cooled frame located in inclined position in a flue and a valve arranged to slide along and seat on the said inclined frame, said valve comprising a hollow box structure having sufficient water capacity to substantially prevent warping by waste gases when used as a controlling valve or damper, whereby the said valve is maintained in close contact with the seating portion of the frame, substantially as described.

12. A valve or damper for use in connection with the flue system of a reversing regenerative furnace having the usual air, gas and stack flues, comprising a hollow water-cooled frame located in inclined position in a flue and a valve arranged to slide along and seat on the said inclined frame, said valve comprising a hollow box structure having sufficient water capacity to substantially prevent warping by waste gases when used as a controlling valve or damper, whereby the said valve is maintained in close contact with the seating portion of the frame, and a flexible connection arranged to raise and lower the valve along its inclined seat and to allow proper seating in different positions thereof, substantially as described.

In testimony whereof, I have hereunto set my hand.

LUTHER L. KNOX.